July 20, 1937.  D. D. HUBBELL  2,087,514

METHOD AND APPARATUS FOR MAKING ONE-PIECE MULTIFOCAL OPHTHALMIC LENSES

Filed June 14, 1933  3 Sheets-Sheet 1

INVENTOR.
Daniel D. Hubbell.
BY Corbett & Mahoney
ATTORNEYS.

July 20, 1937.  D. D. HUBBELL  2,087,514
METHOD AND APPARATUS FOR MAKING ONE-PIECE MULTIFOCAL OPHTHALMIC LENSES
Filed June 14, 1933   3 Sheets-Sheet 2

INVENTOR.
Daniel D. Hubbell.
BY
Corbett & Mahoney
ATTORNEYS.

July 20, 1937. D. D. HUBBELL 2,087,514
METHOD AND APPARATUS FOR MAKING ONE-PIECE MULTIFOCAL OPHTHALMIC LENSES
Filed June 14, 1933 3 Sheets-Sheet 3

INVENTOR.
Daniel D. Hubbell.
BY
Corbett & Mahoney
ATTORNEYS.

Patented July 20, 1937

2,087,514

UNITED STATES PATENT OFFICE 2,087,514

METHOD AND APPARATUS FOR MAKING ONE-PIECE MULTIFOCAL OPHTHALMIC LENSES

Daniel D. Hubbell, Columbus, Ohio

Application June 14, 1933, Serial No. 675,801

10 Claims. (Cl. 51—55)

My invention relates to method and apparatus for making one-piece multifocal ophthalmic lenses. It has to do particularly with bifocal lenses. However, it is capable of application to lenses having more than two fields of vision.

In the prior art, the minor lenticular surfaces of one-piece multifocal ophthalmic lenses have been subject to rigid limitations as to contour shape because of the lack of available practicable methods for grinding and polishing the several lenticular areas of the blank to any selected shape. Thus, though minor lenticular surfaces of many different contour shapes have been embodied in cement bifocals, this has not been true of one-piece bifocals.

For illustration, that type of one-piece bifocal most commonly made for a long time embodied a minor lenticular portion which comprised approximately one-half of a circle of relatively large diameter with the open portion of the half circle at the bottom of the lens and with the closed portion of the half circle extending well up into the lens. The diameter of the circle was large because a surface having this contour shape was more easily made. It became more or less customary to produce two lenses from one blank by forming a minor lenticular area on the blank of circular form and then cutting two lenses therefrom to produce a minor lenticular surface of the type indicated in each lens.

It was found that a bifocal lens having a minor lenticular portion of this semicircular form extending substantially entirely across the lens had certain disadvantages. One of these disadvantages resulted from the fact that there remained no substantial distance vision area along the lower sides of the minor lenticular area. It was also found that the formation of the minor lenticular area from a relatively large circle produces marked "jump of the image" at the dividing line as well as a partial blurring of the image along the dividing line.

Then, the art trended towards the use of minor lenticular portions formed from circles of comparatively small diameter. However, in practically all of these types of lenses that have been marketed, the minor lenticular portion has been formed of circular contour on the blank. Then, the lens has been cut from the blank so as to embody in it a minor lenticular area either of circular form or of partially circular form with an open side of the circle located at the lower edge of the lens.

This development has, to some extent, obviated the disadvantages arising from the use of a minor lenticular portion formed from a circle of relatively large diameter, as described above. However, it has accentuated other disadvantages, such as the restricted area of vision immediately below the dividing line between the minor portion and the major portion of the lens, such as necessarily results where the dividing line takes the form of a comparatively deep arc.

In an attempt to produce a minor lenticular surface of a contour which will overcome the indicated drawbacks of minor lenticular surfaces of the types described, it has been suggested that the minor lenticular surface be given the form of a half circle with its open side uppermost, that is, with the horizontal diameter line of the circle forming the upper edge of the segment and being the dividing line between the minor and major lenticular portions. The method proposed for the production of a lens having these characteristics is unduly complicated and is impracticable.

This proposed method contemplates the initial formation on a blank of two concentric surfaces of different curvatures with the minor surface of circular form and the major surface of annular form disposed in enclosing relation to the minor surface. The plan is to complete the grinding and polishing of both of these surfaces to final form and to then grind away the upper half of the circular minor portion until the ground away area conforms with the finished surface of the surrounding portion of the major lenticular area, followed by the polishing of the area which has thus been ground away.

This method presents certain difficulties which render it impracticable. One of these difficulties arises from the fact that the grinding away of the said portion of the minor area until its curvature coincides with the curvature of the surrounding area will inevitably result in marring the surrounding area so as to render it unfit for lenticular purposes. Of course, if the surface ground away is not ground into coincidence with the surface curvature of the surrounding area, this surrounding area will not be marred but the area which has been ground away will be separated from the surrounding area by a shoulder. In other words, it is not practicable to produce a single surface of uniform curvature by grinding one area of such surface to final form and subsequently grinding another area thereof by a separate and independent grinding operation.

It has also been suggested that the minor lenticular surface be given the form of a rectangle extending across the lens and having rounded ends. But the methods suggested for making this type of lenticular surface involved the formation of practically the entire area of the surface below the surrounding surface of the major lenticular portion. This necessitates the production of a shoulder extending substantially entirely around the minor lenticular portion, which presents obvious disadvantages both from the standpoint of cleaning the lens and impairment of vision.

One of the objects of this invention is to provide a method of producing a one-piece multifocal ophthalmic lens which will permit of the formation of minor lenticular portions of any desired contour.

Another object of this invention is to provide a simple apparatus which may be readily adapted to the production of minor lenticular portions of any selected shape.

This application is a continuation in part of my application Serial No. 576,071, filed November 19, 1931, upon Multifocal lenses and the method of making the same, now Patent No. 1,928,538, dated September 26, 1933.

Various types of lenses and lens blanks and the method and apparatus by which such lenses and lens blanks may be made in accordance with my invention are shown in the accompanying drawings wherein.

Figure 1:
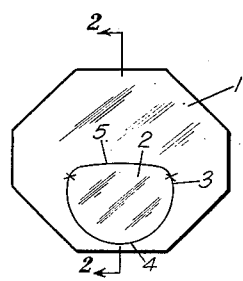
Figure 1 is a plan view of the concave side of a bifocal lens illustrating a minor lenticular portion of a preferred contour.
Figure 2:
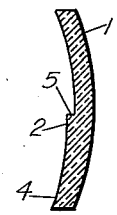
Figure 2 is a sectional view taken on line 2—2 of Figure 1 and showing the shoulder at the top dividing line of the minor lenticular portion as well as the merged relation of the lower edge of the minor lenticular portion with the surrounding major portion of the lens.

In the drawings, one type of bifocal lens which may be readily made by the method and apparatus devised by me is illustrated in Figures 1 and 2. It is shown as comprising a major lenticular portion 1 and a minor lenticular portion 2. In this form, it will be noted that the minor lenticular portion merges with the major lenticular portion at its sides 3 and at its lower edge 4. At its upper edge, which forms the top dividing line, between the points X—X, Figure 1, it projects slightly above the adjacent surface of the major lenticular portion to form a shoulder 5 which is of greatest height midway between the points X—X and which decreases gradually on both sides of this central point until it merges with the major lenticular surface.

Figure 5:
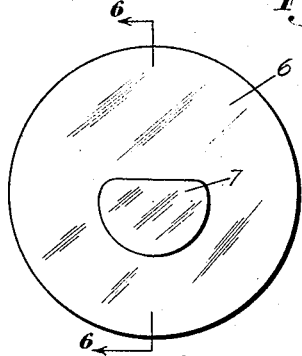
Figure 5 is a plan view of a concave surface of a blank made in accordance with my invention, with the major lenticular surface ground and polished to final form but with the minor lenticular surface still unfinished.
Figure 6:
Figure 6 is a section taken on line 6—6 of Figure 5.

The first step of making a lens blank for the production of a lens of the form illustrated in Figures 1 and 2 consists in completely grinding a major lenticular surface 6 on the concave side of the blank as illustrated in Figures 5 and 6. This leaves a button 7 projecting above the surrounding major lenticular surface at all points on its periphery. The next step is to grind away the surface of this button until all of its edge, with the exception of the portion at the top between the points X—X merges with the surrounding surface 6 of the major lenticular area.

Figure 7:
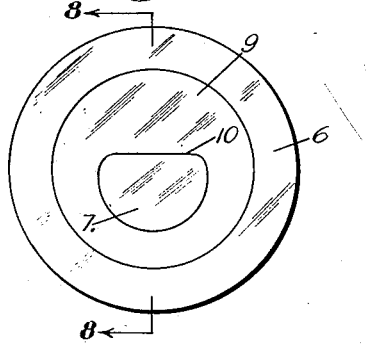
Figure 7 is a plan view similar to Figure 5 but illustrating the placing of a mat upon the major lenticular surface in surrounding relation to the minor lenticular surface to form a support for the grinding and polishing tools during the finishing of the minor lenticular surface.
Figure 8:
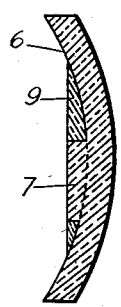
Figure 8 is a section taken on line 8—8 of Figure 7.

Before grinding the button 7 to produce a minor lenticular surface, I preferably superimpose, upon the major lenticular surface, a mat 9 of glass or other suitable material whose lower surface conforms to the curvature of the finished surface 6 of the major lenticular portion. This mat 9 is provided with an aperture 10 whose size and contour is such that it will snugly fit the button 7, as illustrated in Figures 7 and 8.

The mat 9 acts as a support for the grinding tool, which operates upon the minor lenticular surface, when this tool projects beyond the area of such surface. It will be understood that this grinding tool preferably rotates at a fixed position in contact with the blank while the blank is so located in relation thereto as to effect the grinding operation in a circular path. The outer circumference of this circular path is fixed so as to coincide with the semicircular portion of my preferred form of segment; thus it projects beyond the cutaway side of the button and, but for the provision of the mat, the grinding tool would tend to tilt and render the minor lenticular surface optically incorrect. It might in some cases contact with and injure the major lenticular surface of the blank.

Figure 9:
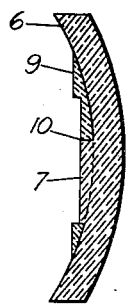
Figure 9 is a sectional view similar to that shown in Figure 8 but with the minor lenticular surface and the surrounding mat partially ground away as in an intermediate stage in the formation of the finished lens blank in accordance with my invention.
Figure 10:
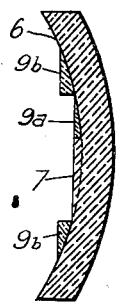
Figure 10 is a section similar to Figure 9 but illustrating a minor lenticular surface and the mat ground away to form the finished lens blank from which the lens of Figures 1 and 2 is to be produced.

The grinding of the button 7 is then initiated and progressively diminishes the depth of the button 7 and the surrounding mat so that they pass through the stage illustrated in Figure 9 and terminate in the form illustrated in Figure 10. In this form illustrated in Figure 10, it will be seen that the mat is entirely ground away with the exception of those portions above the top dividing line of the button 7 which are illustrated at 9a and 9b in Figure 10.

Figure 11:
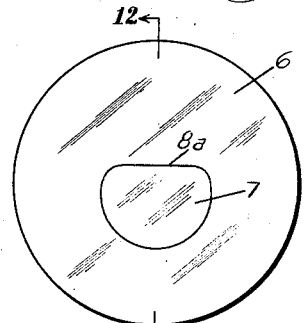
Figure 11 is a plan view of the concave surface of the finished lens blank of Figure 10, with the remaining portion of the mat removed therefrom.
Figure 12:
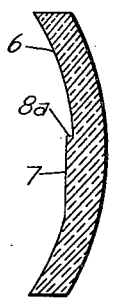
Figure 12 is a section taken on line 12—12 of Figure 11.

When the portions 9a and 9b of the glass mat are removed from the blank, the button 7 is in the form illustrated in Figures 11 and 12. As shown in these figures, this button merges throughout its semicircular edge with the surrounding surface 6 of the major lenticular portion. At its top edge, it is raised above the adjacent surface 6 of the major lenticular portion to form the shoulder 8a.

From the blank which has thus been formed, the lens of Figures 1 and 2 may be cut. Likewise, the cutting operation may be such as to eliminate a part of the minor lenticular portion if desired.

Figure 16:
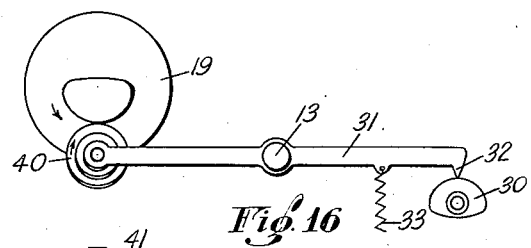
Figure 16 is a diagrammatic plan view of the grinding apparatus which I preferably utilize for performing my method.
Figure 17:
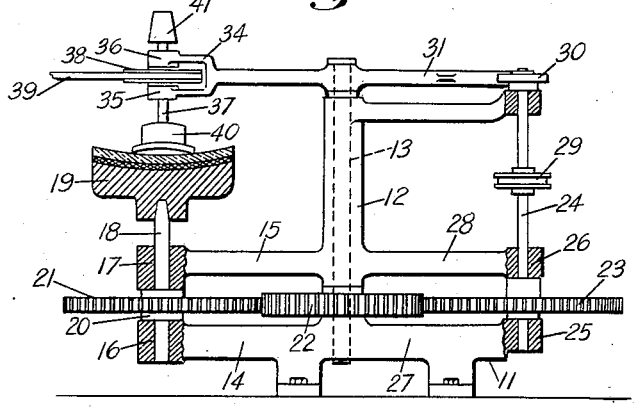
Figure 17 is a side elevation, partially in section, of the grinding apparatus illustrated in Figure 16.

The apparatus which I have devised for the grinding of the surface 6 of the major lenticular portion of the blank and for simultaneously shaping the minor lenticular portion of a lens such as shown in Figures 1 and 2 is illustrated in Figures 16 and 17. It preferably comprises a base 11 having an upstanding central standard 12 with a cylindrical bearing rod 13 projecting above the upper end thereof.

The base 11 is provided at one side thereof with vertically spaced arms 14 and 15 whose extremities carry bearings 16 and 17 for the support of a rotatable spindle 18. The upper end of the spindle 18 is designed to carry a lens blank holder 19 which is preferably provided with an upper concave surface for the reception of a concavo-convex lens blank.

Carried upon the spindle 18 and keyed thereto is the hub 20 of a gear 21, this hub and gear being located in between the spaced bearings 16 and 17. The gear 21 meshes with a gear 22 which is rotatably mounted upon the bearing rod 13 and this gear 22 in turn meshes with a gear 23 which is carried upon the shaft 24. The shaft 24 is carried in bearings 25 and 26 which are in turn carried by the arms 27 and 28 which form a part of the base and standard, respectively.

The upstanding shaft 24 carries, intermediate its length, a pulley 29 designed to be rotated by a belt (not shown). At its upper end, this shaft 24 has, rigidly mounted thereon, a cam 30. Though this cam is rigidly mounted on the shaft, it is removable and replaceable by any one of a series of cams of different contour. It will be apparent that since the gears 21 and 23 are of the same diameter, the cam 30 and the lens blank holder 19 will be rotated at the same rate of speed.

Fulcrumed upon the upper end of the bearing rod 13 is a lever 31 which is provided at one end with a toe 32 designed to cooperate with the cam 30, being normally held in contact therewith by a tension spring 33. The opposite end of the lever 31 is bifurcated as at 34 to provide spaced bearings 35 and 36 for the reception of a vertically disposed spindle 37 which is so mounted in these bearings that it may slide freely therein.

Intermediate the bearings 35 and 36, the spindle 37 has a pulley 38 which is splined thereon and which is designed to be driven to effect rotation of the spindle 37 by means of a belt 39.

At its lower end, the spindle 37 carries a grinding tool 40 so that rotation of the spindle also results in rotation of this grinding tool. At its upper end, the spindle is provided with a weight 41 which normally serves to hold the grinding tool firmly in contact with the lens blank which is mounted on the blank carrier 19 and upon which the grinding tool is designed to operate.

In operation, power is transmitted to the pulley 29 to effect rotation thereof and this results in rotation of the shaft 24, the gears 23, 22 and 21 with the result that the lens blank carrier 19 is rotated about its own vertical axis. At the same time, power is transmitted through the pulley 38 to the spindle 37 so that the tool 40 also rotates about its own axis. The cam 30 operates upon the lever 31 to maintain the grinding tool in off-center relation to the blank, though the shape of the cam is such as to bring about a movement of the grinding tool substantially radially across the surface of the blank. Since the cam 30 and the lens blank holder 19 will rotate at the same rate of speed, as explained, and since movement of the grinding tool 40 is controlled by cam 30, the grinding tool will be moved towards and from the center of rotation of the lens blank during each rotation of the blank. This results in the grinding of the major lenticular surface of the blank and the leaving of an area of predetermined contour in the center of the blank, which area of predetermined contour is to be ultimately ground and finished to produce the minor lenticular surface. It is obvious that the shape of this minor lenticular surface is determined by the shape of the cam 30.

Figure 18:
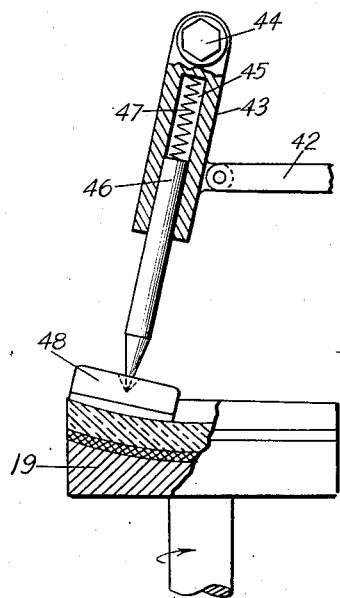
Figure 18 is a side elevation, partially in section, of a portion of a modified form of grinding apparatus which I may use in the formation of a major lenticular surface.

If desired, in the performance of my method, I may use an apparatus which is substantially identical with that shown in Figures 16 and 17, with the exception that the means for supporting and controlling the position of the grinding tool is somewhat varied. This is illustrated in Figure 18, wherein the lever 31 has been replaced by a reciprocable member 42 which is pivotally connected with a housing 43 which is pivotally mounted at its upper end as at 44. The housing 43 is provided with a downwardly opening socket 45 for the reception of a pin 46 that is normally pressed outwardly by a compression spring 47. The lower end of the pin 46 bears against a grinding tool 48 which is caused to rotate by its frictional contact with the blank which is mounted on the rotating blank carrier 19. The opposite end of the member 42 may be somewhat varied as to form but is preferably so related to a rotating cam such as that shown at 30 in Figures 16 and 17 that the tool will move towards and from the vertical axis of the blank at proper periods during each rotation of the blank, so as to form a button of selected contour from which the minor lenticular portion will ultimately be produced.

Figure 3:
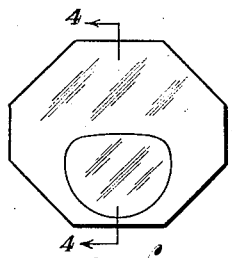
Figure 3 is a plan view of a concave surface of a bifocal lens whose minor lenticular portion has the same contour as that shown in Figure 1, though it is partially submerged to decrease the height of the shoulder at its top dividing line.
Figure 4:
Figure 4 is a section taken on line 4—4 of Figure 3.
Figure 13:
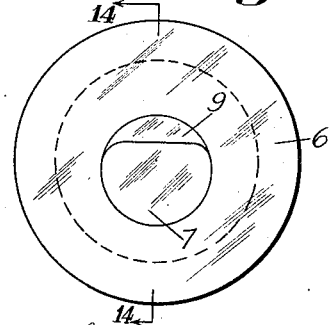
Figure 13 is a plan view of the concave side of a finished lens blank from which the lens of Figures 3 and 4 is to be cut, this view showing a portion of the mat still in position on the blank.
Figure 14:
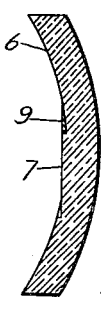
Figure 14 is a section taken on line 14—14 of Figure 13.
Figure 15:
Figure 15 is a view of the blank similar to that shown in Figure 14 with the remaining portions of the mat removed from the blank.

In producing the finished blank from which the type of lens shown in Figures 3 and 4 is to be cut, the surface 6 of the major lenticular portion of the blank is preferably produced by the same identical method and apparatus as in making a finished blank from which the type of lens shown in Figures 1 and 2 is to be cut. Thus, the first step is to grind the surface 6 so as to produce the blank of Figures 5 and 6. Then, a mat of glass identical with that shown in Figures 7 and 8 is placed upon the blank. The grinding operation upon the minor lenticular area progresses through the stage illustrated in Figures 9 and 10. However, the grinding operation proceeds still further until a portion of the minor lenticular area is submerged beneath the surrounding area of the major lenticular surface and the protective mat is almost entirely cut away, as illustrated in Figures 13 and 14. Removal of the mat leaves a blank of the structure illustrated in Figures 13, 14 and 15.

It will be seen from this that I have provided a novel method and apparatus for making one-piece multifocal ophthalmic lenses which permits of the formation of the various lenticular surfaces of the blank and the lens with a minimum of effort and with a simple series of steps that permit of the production of multifocal lenses with great facility. Furthermore, it will be apparent that my method is such that the major lenticular surface of the blank may be produced in a single operation, while the subsequent operations are such that there is no danger of marring this major lenticular surface which has already been produced.

It will likewise be seen that my method and apparatus are such as to permit of the formation on the blank of a minor lenticular surface having any desired contour. Thus, this method and apparatus make possible the reproduction of the various shapes of segments common to cement bifocals, as well as other shapes, in one-piece bifocals in a practicable and economical way.

Another advantage of my invention arises from the fact that I have provided a simple and effective means for protecting the major lenticular surface after it is formed and for supporting the tool which is used to finish the minor lenticular surfaces when it projects beyond the edge of any minor lenticular surface so as to preclude the malformation of said surface.

It will also be apparent that I have provided a novel method and apparatus which make possible the production of minor lenticular surfaces of any contour and either projecting above the surrounding surface, partially merged therewith or partially submerged with relation thereto. Thus, minor lenticular surfaces of practically any contour may be formed by my method without the necessity of producing shoulders extending entirely around or substantially around such surfaces.

Though my method and apparatus have been described primarily in connection with "grinding" of the respective lenticular surfaces, it will be understood that my method and apparatus are applicable to polishing. Therefore, the term "grinding" as used by me in the specification and claims is intended to include polishing. It will also be understood that some of the surfaces of my lens may be formed other than by grinding and polishing without departing from the scope of my invention.

Various other advantages will appear from the preceding description and from the appended claims.

Having thus described my invention, what I claim is:

1. The method of manufacturing a one-piece multifocal ophthalmic lens blank which comprises subjecting a blank to an abrading operation which forms an outer surface thereon with a non-circular inner boundary so that there is simultaneously formed on said blank the outer boundary of an inner area of non-circular outline with a shoulder along its edge, placing a mat along the said shoulder, and then finishing the said inner area to produce a lenticular surface thereon.

2. The method of manufacturing a one-piece multifocal ophthalmic lens blank which comprises subjecting a blank to an abrading operation which forms an outer surface thereon with a non-circular inner boundary so that there is simultaneously formed on said blank an outer boundary of an inner segment of non-circular outline with a shoulder extending along its entire edge, placing a mat which entirely surrounds said segment along said shoulder, and then finishing the surface of said segment to produce a lenticular surface thereon.

3. Apparatus for grinding one-piece multifocal ophthalmic lenses, comprising a lens blank carrier, means for rotating said lens blank carrier, an abrading tool disposed in position to form a surface on a lens blank mounted on said carrier, and means for causing relative movement of said abrading tool and said lens blank carrier in proper-timed relation during each rotation of said lens blank carrier to cause said abrading tool to traverse a non-circular path on said blank thereby forming a non-circular inner boundary of the surface so formed on said lens blank.

4. Apparatus for grinding one-piece multifocal ophthalmic lenses, comprising a lens blank carrier, means for rotating said lens blank carrier, an abrading tool disposed in position to form a surface on a lens blank mounted on said carrier, and means for causing relative movement of said abrading tool and said lens blank carrier in proper-timed relation during each rotation of said lens blank carrier, so as to cause the path of the abrading tool to approach and recede from the center of rotation of said carrier during each rotation thereof, thereby forming a non-circular inner boundary of the surface so formed on said lens blank.

5. Apparatus for grinding one-piece multifocal ophthalmic lens blanks, comprising a lens blank carrier, means for rotating said lens blank carrier, an abrading tool disposed in position to form a surface on a lens blank mounted on said carrier, and means for causing relative movement of said abrading tool and said lens blank carrier in proper-timed relation during each rotation of said lens blank carrier, so as to cause the path of the abrading tool to approach and recede from the center of rotation of said carrier once during each rotation thereof, thereby forming a non-circular inner boundary of the surface so formed on said lens blank.

6. Apparatus for grinding one-piece multifocal ophthalmic lens blanks, comprising a lens blank carrier, means for rotating said lens blank carrier, an abrading tool disposed in position to form a surface on a lens blank mounted on said carrier, and means for causing relative movement of said abrading tool and said lens blank carrier in proper-timed relation during each rotation of said lens blank carrier, so as to cause the path of the abrading tool to approach and recede from the center of rotation of said carrier during each rotation thereof, thereby forming a non-circular inner boundary of the surface so formed on said lens blank, said means for controlling relative movement between the tool and lens blank carrier being cam-controlled.

7. Apparatus for grinding one-piece multifocal ophthalmic lens blanks, comprising a lens blank carrier, means for rotating said lens blank carrier, an abrading tool disposed in position to form a surface on a lens blank mounted on said carrier, said abrading tool being disposed eccentric to the center of rotation of said carrier, and means for causing relative movement of said abrading tool and said lens blank carrier in proper-timed relation during each rotation of said lens blank carrier, so as to cause the path of the abrading tool to approach and recede from the center of rotation of said carrier during each rotation thereof, thereby forming a non-circular inner boundary of the surface so formed on said lens blank.

8. A device for generating on a multifocal lens blank an outer vision field having an inner boundary line of predetermined non-circular form, including a holder for the blank, a generating tool adapted to be applied to the surface of the outer field for generating the same to the desired curvature, means for moving said tool and blank relative to each other for generating said surface, and a cam for positively guiding the relative movement between said tool and blank to form the prescribed inner boundary line.

9. A device for generating on a multifocal lens blank an outer vision field with an inner boundary line of a predetermined non-circular form, including a generating tool adapted to be applied to the surface of the blank, means for imparting relative movement between said tool and blank, a holder for said blank, and a cam surface associated in fixed relationship with said blank and rotatable therewith for positively guiding the movement between the tool and blank to define an inner boundary line for said field of a prescribed form.

10. A device for generating on a multifocal lens blank an outer vision field having an inner boundary line of predetermined non-circular form, including a rotatable holder for the blank, a generating tool adapted to be applied to the outer portion of the surface of the lens blank for generating the same to the desired curvature, and means for causing relative movement between said tool and blank in proper timed relation with the rotation of the blank holder to form the prescribed inner boundary line of the outer vision field of the blank.

DANIEL D. HUBBELL.